United States Patent
Miyashita et al.

(10) Patent No.: US 9,211,890 B2
(45) Date of Patent: Dec. 15, 2015

(54) VEHICLE CONTROL DEVICE, VEHICLE AND VEHICLE CONTROL METHOD

(75) Inventors: Michihiro Miyashita, Susono (JP); Koji Ito, Nagoya (JP); Nobukazu Ueki, Susono (JP); Kouhei Tochigi, Susono (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 16 days.

(21) Appl. No.: 14/361,412

(22) PCT Filed: Jan. 11, 2012

(86) PCT No.: PCT/JP2012/000124
§ 371 (c)(1),
(2), (4) Date: May 29, 2014

(87) PCT Pub. No.: WO2013/105132
PCT Pub. Date: Jul. 18, 2013

(65) Prior Publication Data
US 2014/0330473 A1    Nov. 6, 2014

(51) Int. Cl.
*B60W 30/188* (2012.01)
*F02D 29/02* (2006.01)
*B60L 7/10* (2006.01)
*B60W 10/30* (2006.01)
*B60W 10/26* (2006.01)

(52) U.S. Cl.
CPC .............. *B60W 30/1886* (2013.01); *B60L 7/10* (2013.01); *B60W 10/26* (2013.01); *B60W 10/30* (2013.01); *F02D 29/02* (2013.01); *B60L 2200/26* (2013.01); *B60W 2510/244* (2013.01)

(58) Field of Classification Search
CPC . B60W 20/1886; B60W 10/26; B60W 10/30; B60L 7/10; F02D 29/02
USPC .......................................................... 701/22
See application file for complete search history.

(56) References Cited

U.S. PATENT DOCUMENTS

| 6,211,681 B1 | 4/2001 | Kagawa et al. | |
| 2009/0024264 A1* | 1/2009 | Aldrich et al. | 701/22 |

(Continued)

FOREIGN PATENT DOCUMENTS

| EP | 575622 A1 | 12/1993 |
| JP | 62-260527 A | 11/1987 |

(Continued)

OTHER PUBLICATIONS

U.S. Appl. No. 14/357,815, filed May 13, 2014.

*Primary Examiner* — Mary Cheung
*Assistant Examiner* — Michael Berns
(74) *Attorney, Agent, or Firm* — Kenyon & Kenyon LLP

(57) ABSTRACT

There is a need to further improve the fuel consumption of a vehicle. There is provided a vehicle control device mounted on a vehicle having: an engine; a battery that is chargeable with an amount of electric power generated by a generator which is driven with power of the engine; and auxiliary machinery that are operated with electric power of the battery. The vehicle control device comprises an idle reduction controller, an SOC detector, a current value obtaining section, a current correcting section, an idle reduction capacity setting section and a remaining capacity controller. The current correcting section comprises: a smoothing process section that makes the current value obtained by the current value obtaining section subject to a smoothing process; a specific auxiliary machine operation detecting section that determines whether a specific auxiliary machine, which is included in the auxiliary machinery and is likely to have a temporary abrupt change of the current value, is in an operating state; and a current change suppressing section that suppresses an effect of a latest current value obtained by the current value obtaining section, in the smoothing process, when the specific auxiliary machine is determined to be in the operating state.

8 Claims, 13 Drawing Sheets

(56) References Cited

U.S. PATENT DOCUMENTS

2009/0243523 A1* 10/2009 Tanaka et al. ............ 318/376
2011/0215764 A1    9/2011 Takahashi et al.

FOREIGN PATENT DOCUMENTS

| | | |
|---|---|---|
| JP | 11-294249 A | 10/1999 |
| JP | 2001-045602 A | 2/2001 |
| JP | 2002-238181 A | 8/2002 |
| JP | 2004-084484 A | 3/2004 |
| JP | 2004-176624 A | 6/2004 |
| JP | 2005-067293 A | 3/2005 |
| JP | 2011-126535 A | 6/2011 |
| JP | 2011-163281 A | 8/2011 |
| JP | 2011-188597 A | 9/2011 |
| WO | 93/12412 A1 | 6/1993 |

* cited by examiner

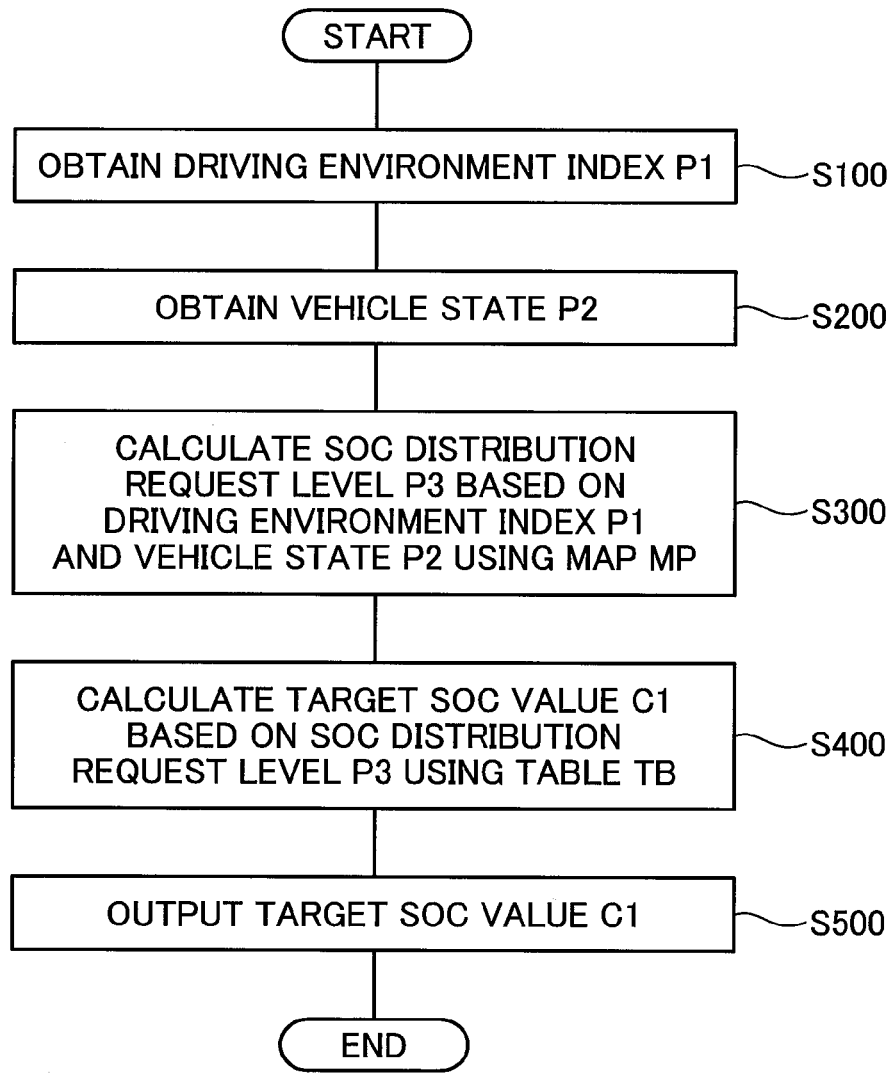

Fig.4 SOC DISTRIBUTION REQUEST LEVEL CALCULATION MAP MP
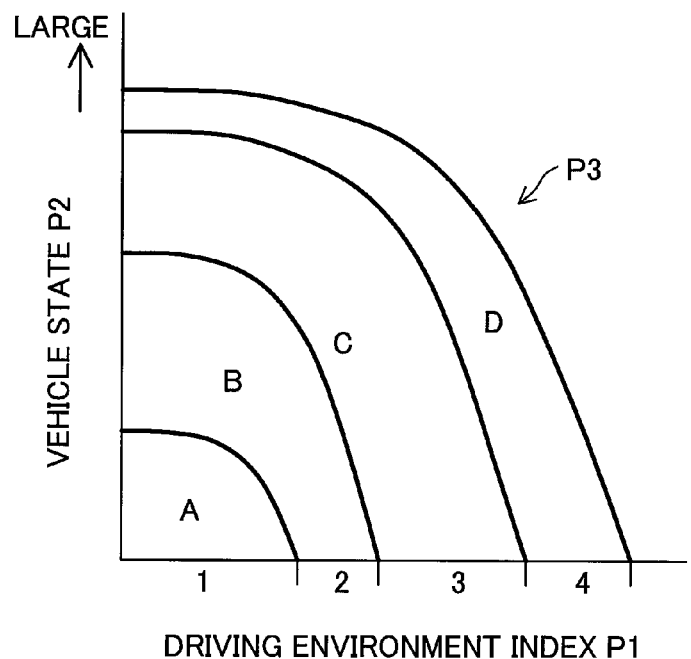
Fig.5 TARGET SOC CALCULATION TABLE TB
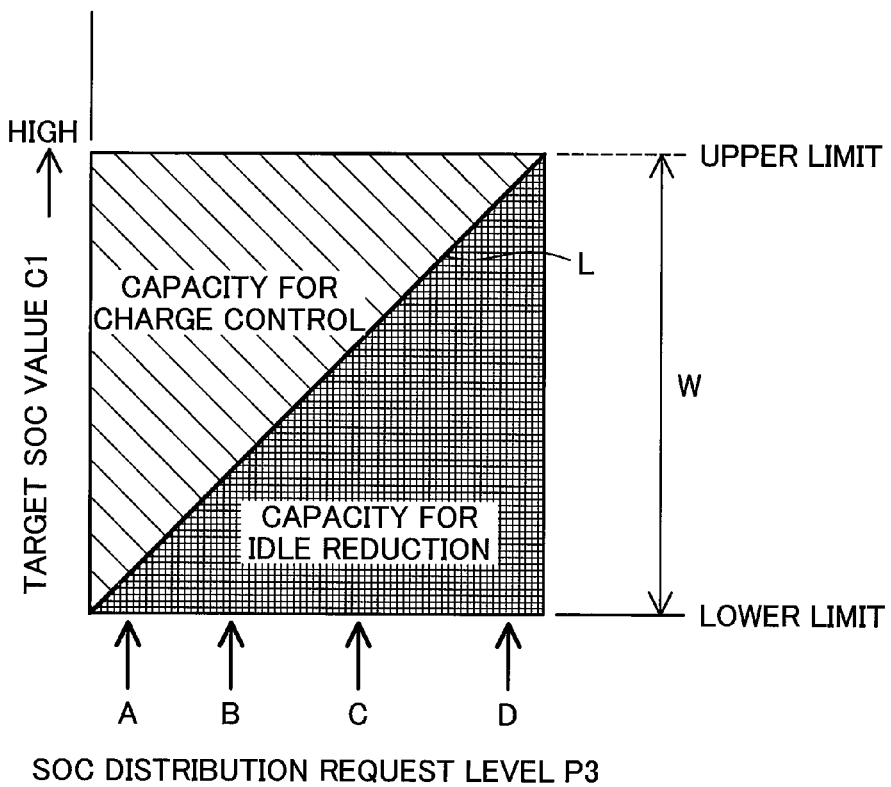

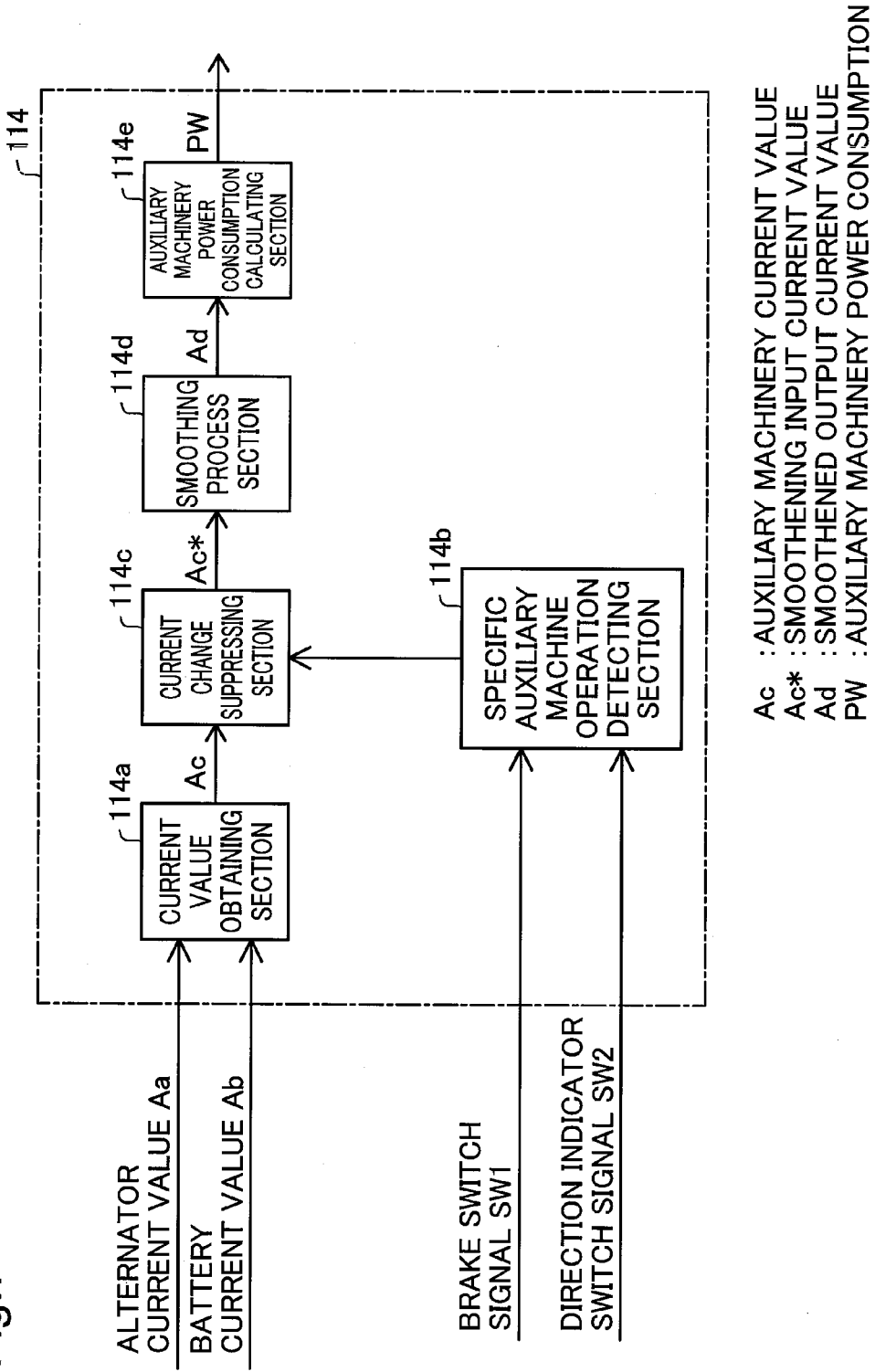

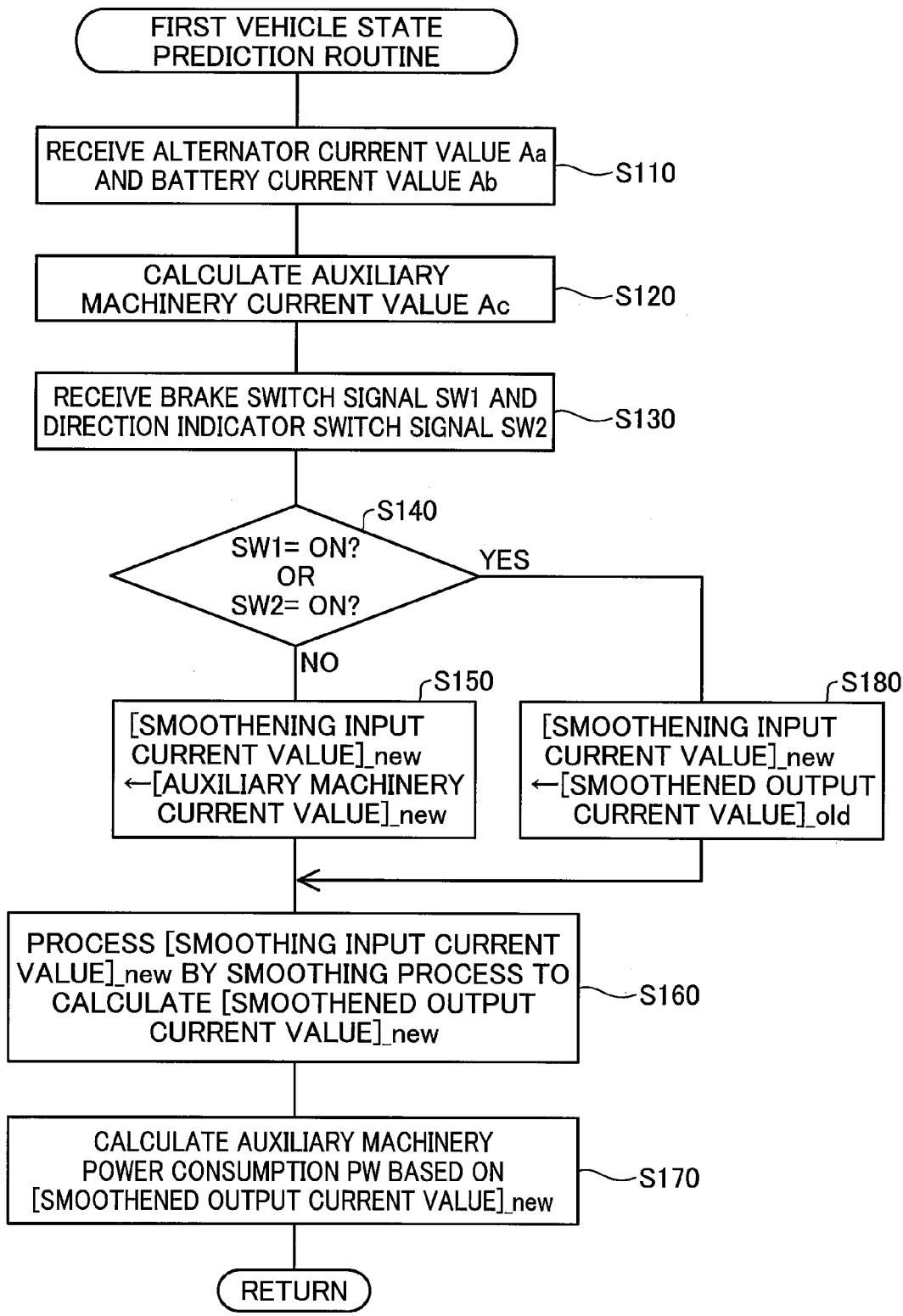

BRAKE SWITCH SIGNAL SW1

DIRECTION INDICATOR SWITCH SIGNAL SW2

AUXILIARY MACHINERY CURRENT VALUE Ac

SMOOTHENED OUTPUT CURRENT VALUE Ad

BRAKE SWITCH SIGNAL SW1

AUXILIARY MACHINERY CURRENT VALUE Ac

SMOOTHENING INPUT CURRENT VALUE Ac*

SMOOTHENED OUTPUT CURRENT VALUE Ad

DIRECTION INDICATOR SWITCH SIGNAL SW2

AUXILIARY MACHINERY CURRENT VALUE Ac

SMOOTHENING INPUT CURRENT VALUE Ac*

SMOOTHENED OUTPUT CURRENT VALUE Ad

VEHICLE CONTROL DEVICE, VEHICLE AND VEHICLE CONTROL METHOD

CROSS-REFERENCE TO RELATED APPLICATIONS

This is a national phase application based on the PCT International Patent Application No. PCT/JP2012/000124 filed Jan. 11, 2012, the entire contents of which are incorporated herein by reference.

TECHNICAL FIELD

The present invention relates to a vehicle control device mounted on a vehicle having an engine and a battery, a vehicle and a vehicle control method.

BACKGROUND ART

An automobile has an engine and a battery, wherein the battery is charged with power of the engine. A known technique of charge control for charging the battery suppresses the battery from being charged during normal running to save the amount of fuel consumption, while allowing the battery to be charged by regenerative power generation during deceleration running.

Idle reduction control is also known as the technology to save the amount of fuel consumption. Patent Literature 1 given below discloses an automobile having both the function of charge control and the function of idle reduction control, in order to meet the requirement for improvement of fuel consumption.

In the above prior art, however, when the amount of electric power accumulated in the battery is consumed by auxiliary machinery during an engine stop by idle reduction control, the engine may be restarted due to shortage of SOC (state of charge). Herein "SOC" is an index indicating how much electric power remains in the battery. Especially in the above prior art, since there is only a little surplus of SOC by the function of charge control, the engine is likely to be restarted due to shortage of SOC. This does not sufficiently improve the fuel consumption, and there is still room for further improvement.

CITATION LIST

Patent Literatures

PTL 1: JP 2005-67293A
PTL 2: JP 2011-163281A
PTL 3: JP 2004-176624A

SUMMARY OF INVENTION

Technical Problem

In order to solve at least part of the problems of the prior art described above, an object of the invention is to further improve the fuel consumption of a vehicle.

Solution to Problem

The invention may be implemented by any of the following aspects and embodiments, in order to solve at least part of the above problems.

[Aspect 1]

There is provided a vehicle control device mounted on a vehicle having: an engine; a battery that is chargeable with an amount of electric power generated by a generator which is driven with power of the engine; and auxiliary machinery that are operated with electric power of the battery. The vehicle control device comprises: an idle reduction controller that performs idle reduction control; an SOC detector that detects a state of charge (SOC) of the battery; a current value obtaining section that obtains a current value of electric current flowing through the auxiliary machinery; a current correcting section that corrects the current value; an idle reduction capacity setting section that sets a capacity for idle reduction, based on the current value corrected by the current correcting section, wherein the capacity for idle reduction is expected to be used in a stop and start period from an engine stop to an engine restart by the idle reduction control, in an available SOC range of the battery, during running of the vehicle; and a remaining capacity controller that controls the amount of electric power generated by the generator, in order to avoid a remaining capacity, which corresponds to the SOC detected by the SOC detector, in the available SOC range from becoming less than the capacity for idle reduction during running of the vehicle. The current correcting section comprises: a smoothing process section that makes the current value obtained by the current value obtaining section subject to a smoothing process; a specific auxiliary machine operation detecting section that determines whether a specific auxiliary machine, which is included in the auxiliary machinery and is likely to have a temporary abrupt change of the current value, is in an operating state; and a current change suppressing section that suppresses an effect of a latest current value obtained by the current value obtaining section, in the smoothing process, when the specific auxiliary machine is determined to be in the operating state.

The vehicle control device according to Aspect 1 controls the amount of electric power generated by the generator during running of the vehicle, so as to avoid the remaining charge in the available SOC range of the battery from becoming less than the capacity for idle reduction, which is expected to be used in the stop and start period. This accordingly suppresses the engine from being restarted due to shortage of SOC in the middle of the stop and start period. An increase in power during operation of the engine to increase the SOC has the greater fuel consumption effect per unit SOC (for example, 1% SOC), compared with the case of restarting an engine due to shortage of SOC in the middle of the stop and start period. This accordingly improves the fuel consumption of the vehicle. Additionally, the vehicle control device according to Aspect 1 suppresses the effect of the latest current value in the smoothing process, when the specific auxiliary machine is operated to have a temporary change of the current value flowing through the auxiliary machinery. This prevents the amount of electric power generated by the generator from being mistakenly controlled due to the temporary change of the current value.

[Aspect 2]

There is provided the vehicle control device according to Aspect 1, further comprising a charge controller that suppresses power generation by the generator during running of the vehicle and allows the battery to be charged by regenerative power generation during deceleration running of the vehicle. The idle reduction capacity setting section sets a parameter specifying a distribution ratio in distribution of the available SOC range of the battery into a capacity for charge control required when the charge controller suppresses power generation by the generator and the capacity for idle reduction, as the capacity for idle reduction.

This configuration distributes the available SOC range of the battery into the capacity for charge control and the capacity for idle reduction. The parameter specifying the distribution ratio between the capacity for charge control and the capacity for idle reduction is set as the capacity for idle reduction. This enables the capacity for idle reduction to be adequately determined in the available SOC range of the battery. Especially in the case of a temporary change of the current value flowing through the auxiliary machinery, this prevents hunting between charge control and idle reduction control by determination of the distribution ratio based on the changing current value.

[Aspect 3]

There is provided the vehicle control device according to either Aspect 1 or Aspect 2, wherein the current change suppressing section causes the smoothening process section to make a previous output result of the smoothening process section subject to the smoothening process, so as to suppress the effect of the latest current value.

This configuration keeps the result of the smoothing process of the previous time as the result of the smoothing process of this time, thus readily suppressing the effect of the latest current value.

[Aspect 4]

There is provided the vehicle control device according to any one of Aspects 1 to 3, wherein the specific auxiliary machine is a blinking auxiliary machine that is likely to be repeatedly turned on and off.

The blinking auxiliary machine fluctuates the current value obtained by the current value obtaining section. The vehicle control device according to Aspect 4 prevents the amount of electric power generated by the generator from being mistakenly controlled, due to a fluctuation of the current value.

[Aspect 5]

There is provided the vehicle control device according to Aspect 4, wherein the blinking auxiliary machine is a stop lamp that is turned on in response to depression of a brake pedal, and the specific auxiliary machine operation detecting section determines whether a brake switch which detects depression or non-depression of the brake pedal is in an ON state.

This configuration prevents the amount of electric power generated by the generator from being mistakenly controlled, due to turning on and off of the stop lamp.

[Aspect 6]

There is provided the vehicle control device according to Aspect 4, wherein the blinking auxiliary machine is a direction indicator, and the specific auxiliary machine operation detecting section determines whether a direction indicator switch which gives an instruction to operate the direction indicator is in an ON state.

This configuration prevents the amount of electric power generated by the generator from being mistakenly controlled, due to flashing of the direction indicator.

[Aspect 7]

There is provided the vehicle control device according to any one of Aspects 1 to 3, wherein the specific auxiliary machine is an instantaneous large current-flowing auxiliary machine that is likely to have an instantaneous flow of large current, and the specific auxiliary machine operation detecting section determines whether the current value obtained by the current value obtaining section is greater than a specified value.

This configuration prevents the amount of electric power generated by the generator from being mistakenly controlled, due to actuation of the instantaneous large current-flowing auxiliary machine that may have an instantaneous flow of large current.

[Aspect 8]

There is provided a vehicle, comprising: an engine; a battery that is chargeable with an amount of electric power generated by a generator which is driven with power of the engine; auxiliary machinery that are operated with electric power of the battery; an idle reduction controller that performs idle reduction control; an SOC detector that detects a state of charge (SOC) of the battery; a current value obtaining section that obtains a current value of electric current flowing through the auxiliary machinery; a current correcting section that corrects the current value; an idle reduction capacity setting section that sets a capacity for idle reduction, based on the current value corrected by the current correcting section, wherein the capacity for idle reduction is expected to be used in a stop and start period from an engine stop to an engine restart by the idle reduction control, in an available SOC range of the battery, during running of the vehicle; and a remaining capacity controller that controls the amount of electric power generated by the generator, in order to avoid a remaining capacity, which corresponds to the SOC detected by the SOC detector, in the available SOC range from becoming less than the capacity for idle reduction during running of the vehicle. The current correcting section comprises: a smoothing process section that makes the current value obtained by the current value obtaining section subject to a smoothing process; a specific auxiliary machine operation detecting section that determines whether a specific auxiliary machine, which is included in the auxiliary machinery and is likely to have a temporary abrupt change of the current value, is in an operating state; and a current change suppressing section that suppresses an effect of a latest current value obtained by the current value obtaining section, in the smoothing process, when the specific auxiliary machine is determined to be in the operating state.

[Aspect 9]

There is provided a vehicle control method of controlling a vehicle having an engine; a battery that is chargeable with an amount of electric power generated by a generator which is driven with power of the engine; and auxiliary machinery that are operated with electric power of the battery. The vehicle control method comprising the steps of: (a) performing idle reduction control; (b) detecting a state of charge (SOC) of the battery; (d) obtaining a current value of electric current flowing through the auxiliary machinery; (e) correcting the current value; (f) setting a capacity for idle reduction, based on the current value corrected in the step (e), wherein the capacity for idle reduction is expected to be used in a stop and start period from an engine stop to an engine restart by the idle reduction control, in an available SOC range of the battery, during running of the vehicle; and (g) controlling the amount of electric power generated by the generator, in order to avoid a remaining capacity, which corresponds to the SOC detected by the SOC detector, in the available SOC range from becoming less than the capacity for idle reduction during running of the vehicle. The step (e) comprises the steps of: making the current value obtained in the step (d) subject to a smoothing process; determining whether a specific auxiliary machine, which is included in the auxiliary machinery and is likely to have a temporary abrupt change of the current value, is in an operating state; and suppressing an effect of a latest current value obtained in the step (d), in the smoothing process, when the specific auxiliary machine is determined to be in the operating state.

The vehicle of Aspect 8 and the vehicle control method of Aspect 9 suppress the engine from being restarted due to shortage of SOC in the middle of the stop and start period and thereby improve the fuel consumption of the vehicle, like the vehicle control device of Aspect 1. Additionally, this prevents the amount of electric power generated by the generator from being mistakenly controlled, due to a temporary change in current value by the specific auxiliary machine.

The invention may be implemented by various aspects: for example, a control system including the vehicle control device described above, a computer program that causes the computer to implement the functions corresponding to the respective steps of the vehicle control method described above, and a storage medium in which such a computer program is stored.

BRIEF DESCRIPTION OF DRAWINGS

FIG. 3 is a flowchart showing a target SOC estimation routine;

FIG. 4 is a diagram illustrating an SOC distribution request level calculation map MP;

FIG. 5 is a diagram illustrating a target SOC calculation table TB;

FIG. 7 is a block diagram illustrating the functions of a vehicle state predictor 114;

FIG. 8 is a flowchart showing a first vehicle state prediction routine;

DESCRIPTION OF EMBODIMENTS

Figure 1:
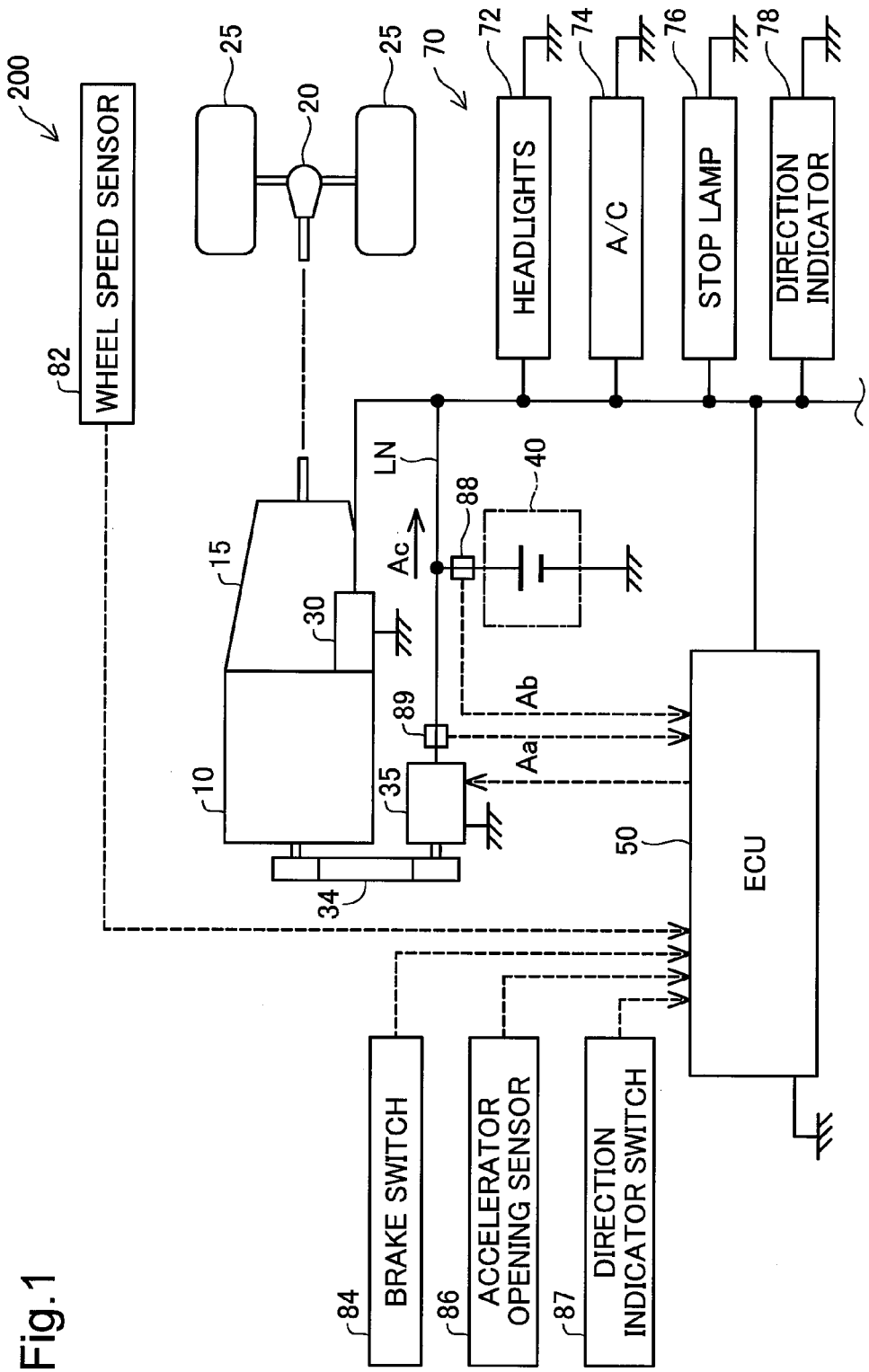
FIG. 1 is a diagram illustrating the configuration of an automobile 200 according to an embodiment of the invention.

Some aspects of the invention are described below with reference to embodiments in the following sequence:
A. General Configuration
B. Configuration of ECU
C. Configuration of Target SOC Estimator
D. Configuration of Vehicle State Predictor
E. Functions and Advantageous Effects
F. Modifications A. General Configuration FIG. 1 is a diagram illustrating the configuration of an automobile 200 according to an embodiment of the invention. The automobile 200 is a vehicle having idle reduction function. The automobile 200 includes an engine 10, an automatic transmission 15, a differential gear 20, drive wheels 25, a starter 30, an alternator 35, a battery 40 and an electronic control unit (ECU) 50.

The engine 10 is an internal combustion engine that generates power by combustion of a fuel such as gasoline or light oil. The power of the engine 100 is transmitted to the automatic transmission 15, while being transmitted to the alternator 35 via a drive mechanism 34. The output of the engine 10 is changed by an engine control computer (not shown) according to the pressure of an accelerator pedal (not shown) stepped on by the driver.

The automatic transmission 15 automatically changes the gear ratio (so-called gear shifting). The power (rotation speed·torque) of the engine 10 is subjected to gear shifting by the automatic transmission 15 and is transmitted as a desired rotation speed·torque via the differential gear 20 to the left and right drive wheels 25. The power of the engine 10 is changed according to the accelerator pedal pressure and is transmitted via the automatic transmission 15 to the drive wheels 25 to accelerate or decelerate the vehicle (automobile 200).

This embodiment employs a belt drive configuration as the drive mechanism 34 transmitting the power of the engine 10 to the alternator 35. The alternator 35 uses part of the power of the engine 10 to generate electric power. The generated electric power is used to charge the battery 40 via an inverter (not shown). In the description hereof, power generation by the alternator 35 using the power of the engine 10 is called "fuel power generation". The alternator 35 corresponds to the "generator" described in [Solution to Problem].

The battery 40 is a lead acid battery serving as a DC power source for a voltage of 14 V and supplies electric power to peripheral devices provided other than the engine main body. In the description hereof, the peripheral devices provided other than the engine main body and operated with electric power of the battery 40 are called "auxiliary machines". The group of auxiliary machines is called "auxiliary machinery". The automobile 200 includes, for example, head lights 72, an air conditioner (A/C) 74, a stop lamp 78 and a direction indicator as the auxiliary machinery 70. The automobile 200 includes the starter 30 described above.

The starter 30 is a self starter to start the engine 10 with electric power supplied from the battery 40. In general, when the driver operates an ignition switch (not shown) to start driving an automobile at a stop, the starter 30 is activated to start the engine 10. This starter 30 is used to restart the engine 10 in the no idling state as described later. In the description hereof, the no idling state means the engine stop state by idle reduction control.

The ECU 50 includes a CPU that performs computer programs, a ROM that stores computer programs and others, a RAM that temporarily stores data and input/output ports connected with, for example, various sensors, switches, actuators and lights. The sensors and switches connected with the ECU 50 include: a wheel speed sensor 82 that detects the rotation speed of the drive wheels 25; a brake switch 84 that detects depression or non-depression of a brake pedal (not shown): an accelerator opening sensor 86 that detects the operation amount of an accelerator pedal (not shown) as an accelerator opening; a battery current sensor 88 that detects the charge-discharge current of the battery 40; an alternator current sensor 89 that detects the output current of the alternator 35; and a direction indicator switch 87 that gives an instruction to operate a direction indicator. The actuators include the starter 30 and the alternator 35. The ECU 50 receives the supply of electric power from the battery 40.

The ECU 50 controls the starter 30 and the alternator 35 based on signals from the various sensors and switches mentioned above and an engine control computer (not shown), so as to control engine stops and restarts (idle reduction control) and control the SOC of the battery 40. This ECU 50 is the vehicle control device directly involved in the invention. The ECU 50 also performs controls to light up a stop lamp 76 in response to the ON state of the brake switch 84 and flash the lamp of a direction indicator 78 in response to the ON state of the direction indicator switch 87.

B. Configuration of ECU

Figure 2:
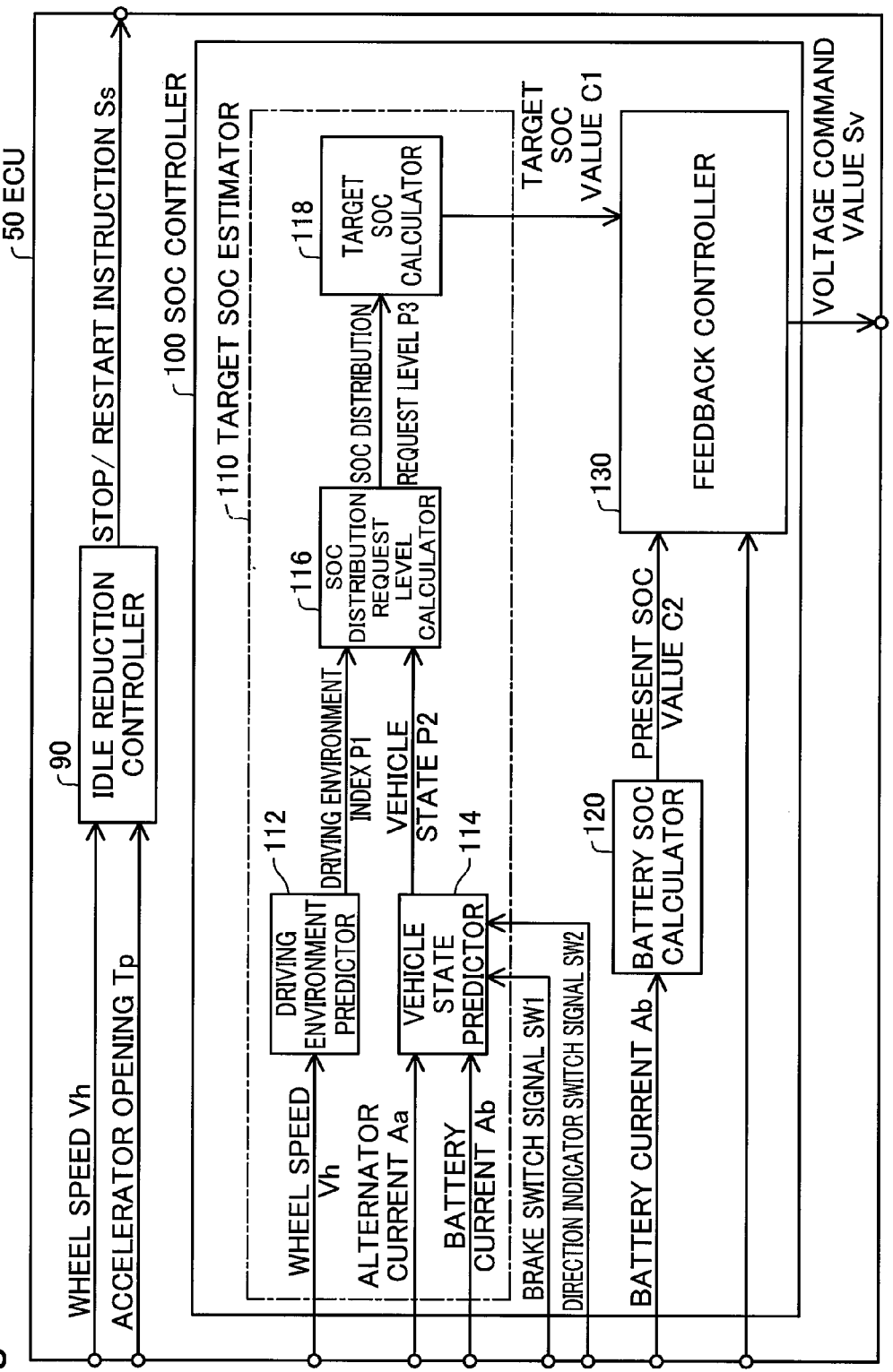
FIG. 2 is a diagram illustrating the functional configuration of an ECU 50.

FIG. 2 is a diagram illustrating the functional configuration of the ECU 50. As illustrated, the ECU 50 includes an idle reduction controller 90 and an SOC controller 100. The functions of the idle reduction controller 90 and the SOC controller 100 are actually implemented by the CPU included in the ECU 50 executing the computer programs stored in the ROM.

The idle reduction controller 90 obtains a wheel speed Vh detected by the wheel speed sensor 82 and an accelerator opening Tp detected by the accelerator opening sensor 86 and outputs an instruction Ss to stop/restart the engine 10 to the starter 30. The stop/restart instruction Ss includes an engine restart instruction which is output to the starter 30 and a fuel cutoff instruction which is output to a fuel supply system (not shown) of the engine 10. More specifically, the idle reduction controller 90 determines that an engine stop condition is satisfied and outputs the fuel cutoff instruction to the fuel supply system, when the wheel speed Vh is reduced below a predetermined speed (for example, 10 km/h). The idle reduction controller 90 determines that an engine restart condition is satisfied and outputs the engine restart instruction to the starter 30, when depression of the accelerator pedal is subsequently detected, based on the accelerator opening Tp.

In other words, the idle reduction controller 90 stops the engine 10 when the engine stop condition is satisfied, and restarts the engine 10 when the engine restart condition is satisfied after the engine stop. The engine stop condition and the engine restart condition are not limited to those described above. For example, the engine stop condition may be that the wheel speed Vh is fully reduced to 0 km/h, and the engine restart condition may be that the driver releases the brake pedal.

The SOC controller 100 includes a target SOC estimator 110, a battery SOC calculator 120 and a feedback controller 130. The target SOC estimator 110 estimates an SOC expected to be used during a time period from an engine stop to an engine restart (hereinafter called "stop and start period") by idle reduction control during vehicle running (for example, when the wheel speed Vh>0 km/h), as a target SOC (hereinafter also called "target SOC value") C1. The detailed configuration will be described in Chapter C. The target SOC estimator 110 corresponds to the "idle reduction capacity setting section" described in [Solution to Problem]. The "SOC" herein is defined as a value obtained by dividing the electric charge remaining in the battery by the electric charge accumulated in the battery in the fully charged state.

The battery SOC calculator 120 calculates a current SOC (hereinafter called "present SOC value") C2 of the battery 40, based on charge-discharge current (called "battery current") Ab of the battery 40 detected by the battery current sensor 88. More specifically, the battery SOC calculator 120 calculates the present SOC value C2 by integrating the charge-discharge currents Ab with setting the charge currents of the battery 40 to positive values and setting the discharge currents of the battery 40 to negative values. The configuration of the battery current sensor 88 and the battery SOC calculator 120 corresponds to the "SOC detector" described in [Solution to Problem]. The SOC detector is not necessarily limited to the configuration that makes a calculation based on the battery current detected by the battery current sensor 88 but may be configured to make a calculation based on, for example, a battery electrolytic solution specific gravity sensor, a cell voltage sensor or a battery terminal voltage sensor. Moreover, the SOC detector is not necessarily limited to the configuration that detects the electric charge remaining in the battery but may be configured to detect the state of charge using another parameter, for example, a chargeable amount.

The feedback controller 130 calculates a difference by subtracting the present SOC value C2 from the target SOC value C1 during vehicle running and determines a voltage command value Sv that makes the calculated difference equal to a value 0 by feedback control. This voltage command value Sv indicates the amount of power to be generated by the alternator 35 and is sent to the alternator 35. As a result, the present SOC value C2 is controlled to the target SOC value C1 by fuel power generation. The feedback controller 130 corresponds to the "remaining capacity controller" described in [Solution to Problem].

The SOC controller 100 has a function called "battery control" and a function called "charge control", in addition to the above functions, although not specifically illustrated. The following describes battery control. The battery or more specifically the lead acid battery of the embodiment has a predetermined available SOC range (operable SOC range) based on the need for prolonged life. Accordingly, the "battery control" is performed to increase the power of the engine 10 and thereby increase the SOC into the above SOC range when the SOC of the battery 40 becomes lower than a lower limit (for example, 60%) of this SOC range and to consume the SOC and thereby decrease the SOC into the above SOC range when the SOC exceeds an upper limit (for example, 90%) of the SOC range. When the SOC becomes lower than the lower limit during an engine stop by idle reduction control, the engine is restarted to increase the SOC into the above SOC range by fuel power generation.

The "charge control" is a control process that suppresses the battery from being charged by fuel power generation during normal running to save fuel consumption and charges the battery by regenerative power generation during deceleration running. The charge control is a known configuration and is thus not specifically described here, but basically performs the following operations. In the charge control, feedback control by the feedback controller 130 during normal running is performed when the target SOC value C1 is greater than the present SOC value C2; a specified power generation cutoff voltage is set to the voltage command value Sv, which is given to the alternator 35, when the target SOC value C1 is equal to or less than the present SOC value C2. This configuration suppresses charging during normal running and saves fuel consumption. The "normal running" herein denotes the state of the automobile 200 other than "vehicle stop" when the vehicle speed is 0 km/h and "deceleration running" when the regenerative power generation described above is performed.

C. Configuration of Target SOC Estimator

The target SOC estimator 110 includes a driving environment predictor 112, a vehicle state predictor 114, an SOC distribution request level calculator 116 and a target SOC calculator 118.

The driving environment predictor 112 predicts the driving environment. The "driving environment" herein is a parameter indicating the extent that the vehicle falls in idle reduction state in the future (from now) and, in other words, a parameter regarding the ratio of a stop and start period in a future predetermined period. The "driving environment" accordingly means the driving environment of the vehicle that causes a vehicle stop by idle reduction control. The driving environment predictor 112 calculates a driving environmental index, which indicates the driving environment by an index, based on a wheel speed Vh detected by the wheel speed sensor 82. more specifically, the driving environment predictor 112 calculates a ratio R of vehicle stop time in a last predetermined period (for example, in last 10 minutes) going back from the present based on the wheel speed Vh and calculates a driving environment index P1 from this calculated ratio R. A concrete procedure counts the total vehicle stop time when the wheel speed Vh is equal to a value 0 in a predetermined period, divides the total vehicle stop time by the total time of the predetermined period to calculate the ratio R and calculates the driving environment index P1 from the ratio R.

The high ratio R indicates a high frequency of vehicle stops and a long vehicle stop time and thereby leads to prediction of a high frequency of future vehicle stops and a long future vehicle stop time. This embodiment accordingly determines the driving environment index P1 as follows:

When the ratio R of vehicle stop time in 10 minutes<38%, the driving environment index P1 is set to a value 1;

When 38%≤the ratio R of vehicle stop time in 10 minutes<42%, the driving environment index P1 is set to a value 2;

When 42%≤the ratio R of vehicle stop time in 10 minutes<46%, the driving environment index P1 is set to a value 3; and When the ratio R of vehicle stop time in 10 minutes≥46%, the driving environment index P1 is set to a value 4.

The above reference values 38%, 42% and 46% are not restrictive but may be replaced with other numerical values. The settings of the driving environment index P1 are not limited to the four values 1 to 4 but may be any other suitable number of values, for example, three values, five values or six values. In general, the suburban area has the lower driving environment index P1, and the urban area has the higher driving environment index P1, so that the higher driving environment index P1 indicates the higher degree of urbanization.

The embodiment determines the driving environment index P1 based on the wheel speed Vh detected by the wheel speed sensor 82, but the invention is not limited to this configuration. For example, the driving environment index P1 may be determined, based on an average value of vehicle speed detected by a vehicle speed sensor, a variation in wheel speed Vh (acceleration) detected by the wheel speed sensor 82, a gear position of a manual transmission in an MT (manual transmission) vehicle or a gear ratio of an automatic transmission in an AT (automatic transmission) vehicle. The lower average value of the vehicle speed indicates the higher degree of urbanization, so that the higher value is set to the driving environment index P1 at the lower average value of vehicle speed. The higher variation in wheel speed Vh indicates the higher degree of urbanization, so that the higher value is set to the driving environment index P1 at the higher variation in wheel speed Vh. The higher frequency of shift in gear position of the manual transmission indicates the higher degree of urbanization, so that the higher value is set to the driving environment index P1 at the higher frequency of shift in gear position of the manual transmission. The higher frequency of change in gear ratio of the automatic transmission indicates the higher degree of urbanization, so that the higher value is set to the driving environment index P1 at the higher frequency of change in gear ratio of the automatic transmission.

The driving environment index P1 may not be necessarily determined based on only one parameter selected among the wheel speed Vh and the respective parameters in place of the wheel speed Vh described above, but may be determined based on two or more of these parameters. In the application using two or more parameters, it is preferable to determine the driving environment index P1 by multiplying the respective parameters by individual weighting factors. Using the wheel speed Vh and the respective parameters in place of the wheel speed Vh described above enables the driving environment to be predicted only in the autonomous system, i.e., the automobile 200. Alternatively the driving environment index P1 may be determined, based on information obtained from outside of the autonomous system. The information obtained from outside of the autonomous system is, for example, road map information of the navigation system. This application may identify whether a future driving area is an urban area or a suburban area based on the road map information of the navigation system and determine the driving environment index P1.

The vehicle state predictor 114 predicts the state of the automobile 200 (vehicle state). The "vehicle state" herein is a parameter indicating how much SOC the automobile 200 is expected to consume hereafter. More specifically, the vehicle state predictor 114 calculates the amount of electric power consumed by the auxiliary machinery 70 based on an alternator current value Aa detected by the alternator current sensor 89, the battery current value Ab detected by the battery current sensor 88, an output signal (brake switch signal) SW1 of the brake switch 84 and an output signal (direction indicator switch signal) SW2 of the direction indicator switch 87, and outputs the calculated amount of electric power as a vehicle state P2. The SOC consumption rate increases with an increase in amount of electric power consumed by the auxiliary machinery 70. According to the embodiment, the vehicle state predictor 114 thus predicts the amount of electric power consumed by the auxiliary machinery 70 as the vehicle state P2. The detailed procedure of calculating the amount of electric power consumed by the own vehicle will be described in Chapter D.

Moreover, the vehicle state predictor 114 determines the current operating state of the auxiliary machinery based on the currently detected sensor signals and regards the current operating state as the future vehicle state. An alternative configuration may read a sign of change in operating state from the current operating state determined as described above, so as to predict the future vehicle state.

The driving environment predictor 112 and the vehicle state predictor 114 of the above configuration continually perform the predictions after the automobile 200 starts operation. The respective components 112 to 114 are actually implemented by the CPU included in the ECU 50 executing the computer programs stored in the ROM. The driving environment index P1 predicted by the driving environment predictor 112 and the vehicle state P2 predicted by the vehicle state predictor 114 are sent to an SOC distribution request level calculator 116.

The SOC distribution request level calculator 116 calculates an SOC distribution request level P3 based on the driving environment index P1 and the vehicle state P2. The target SOC calculator 118 calculates a target SOC value C1 based on the SOC distribution request level P3. The following describes the detailed processes of the SOC distribution request level calculator 116 and the target SOC calculator 118.

FIG. 3 is a flowchart showing a target SOC estimation routine. This target SOC estimation routine is performed repeatedly at predetermined time intervals (for example, 60 sec) during vehicle running. In other words, the target SOC estimation routine is not performed during a stop of the engine 10 by idle reduction control. As illustrated, when the process flow starts, the CPU of the ECU 50 obtains the driving environment index P1 predicted by the driving environment predictor 112 (FIG. 2) (step S100) and also obtains the vehicle state P2 predicted by the vehicle state predictor 114 (FIG. 2) (step S200).

After execution of step S200, the CPU calculates an SOC distribution request level based on the driving environment index P1 and the vehicle state P2 by using an SOC distribution request level calculation map MP (step S300). The available SOC range is set for each type of battery as described above. The procedure of the embodiment distributes the available SOC range into an SOC range for idle reduction and an SOC range for charge control. The "SOC distribution request level" herein is a parameter specifying the level of the above distribution.

FIG. 4 is a diagram illustrating the SOC distribution request level calculation map MP. As illustrated, the SOC distribution request level calculation map MP has the driving environment index P1 as abscissa and the vehicle state P2 as ordinate and stores map data to map the SOC distribution request level P3 related to the value on the abscissa and the value on the ordinate. The SOC distribution request level calculation map MP is created by determining the relationship of the SOC distribution request level P3 to the driving environment index P1 and the vehicle state P2 in advance experimentally or by simulation and is stored in the ROM. The process of step S300 reads the SOC distribution request level calculation map MP from the ROM and refers to this map MP to obtain the SOC distribution request level P3 related to the driving environment index P1 obtained at step S100 and the vehicle state P2 obtained at step S200. In the illustrated example, four value, A, B, C and D are provided as the SOC distribution request level P3. The values descend in the order of D, C, B and A. The SOC distribution request level P3 increases with an increase in the driving environment index P1. The SOC distribution request level P3 increases with an increase in the vehicle state P2.

Referring back to FIG. 3, after execution of step S300, the CPU calculates the target SOC value C1 based on the SOC distribution request level P3 by using a target SOC calculation table TB (step S400).

FIG. 5 is a diagram illustrating the target SOC calculation table TB. As illustrated, the target SOC calculation table TB has the SOC distribution request level P3 as abscissa and the target SOC value C1 as ordinate and shows the relationship of the target SOC value C1 to the SOC distribution request level P3 by a linear line L. The target SOC calculation table TB is created by determining the relationship of the target SOC value C1 to the SOC distribution request level P3 in advance experimentally or by simulation and is stored in the ROM. The process of step S400 reads the target SOC calculation table TB from the ROM and refers to this table TB to obtain the target SOC value C1 related to the SOC distribution request level P3 calculated at step S300.

As illustrated, the target SOC value C1 shown by the linear line L is a value set in an available SOC range W of the battery 40 and indicates a distribution rate when the available SOC range W is distributed into a capacity for charge control and a capacity for idle reduction. More specifically, the area of the capacity for idle reduction is set on the lower side of the available SOC range W of the battery 40, and the area of the capacity for charge control is set on the upper side. The boundary between these two areas shows the target SOC value C1. In other words, the level determined by adding the capacity for idle reduction to the lower limit of the available SOC range W is set as the target SOC value C1.

The capacity for charge control is a battery capacity required due to suppression of fuel power generation by the charge control described above. The capacity for idle reduction is a capacity expected to be used in the future stop and start period. According to this embodiment, the capacity for idle reduction is set to an expected maximum capacity. The capacity for idle reduction increases with an increase in SOC distribution request level P3. When the SOC is controlled to the upper side of the linear line L, the remaining capacity corresponding to the SOC in the available SOC range exceeds the capacity for idle reduction. This causes the idle reduction control to be fully implemented and further has an excess corresponding to the exceeding capacity. The target SOC value C1 shown by the linear line L accordingly indicates the SOC that enables idle reduction control to be fully implemented hereafter and minimizes the amount of power generation for accumulation of SOC.

The target SOC value C1 linearly increases with an increase in SOC distribution request level P3 as shown by the linear line L. The invention is, however, not limited to this example. For example, the target SOC value C1 may be configured to linearly increase with an increase in SOC distribution request level P3 when the SOC distribution request level P3 is equal to or less than a predetermined value and to maintain a fixed value when the SOC distribution request level P3 is greater than the predetermined value. This configuration is effective for a battery having a relatively narrow available SOC range. Additionally, a change in target SOC value C1 may be shown by a curved line, instead of the linear line.

Referring back to FIG. 3, after execution of step S400, the CPU outputs the target SOC value C1 calculated at step S400 to the feedback controller 130 (step S500) and subsequently terminates the target SOC estimation routine. The feedback controller 130 (FIG. 2) controls the present SOC value C2 to the calculated target SOC value C1. The present SOC value C2 indicates the remaining capacity in the available SOC range of the battery 40. The control described above results in avoiding the remaining capacity from becoming less than the capacity for idle reduction during vehicle running. More specifically, when the present SOC value is located in the area of the capacity for charge control in FIG. 5, i.e., when the remaining capacity is greater than the capacity for idle reduction, charge control is performed to suppress the battery 40 from being charged by fuel power generation. When the SOC decreases and is becoming less than the capacity for idle reduction, the SOC is controlled to the target SOC value C1 shown by the linear line L by fuel power generation. Such control accordingly prevents the SOC from becoming less than the capacity for idle reduction.

Figure 6:
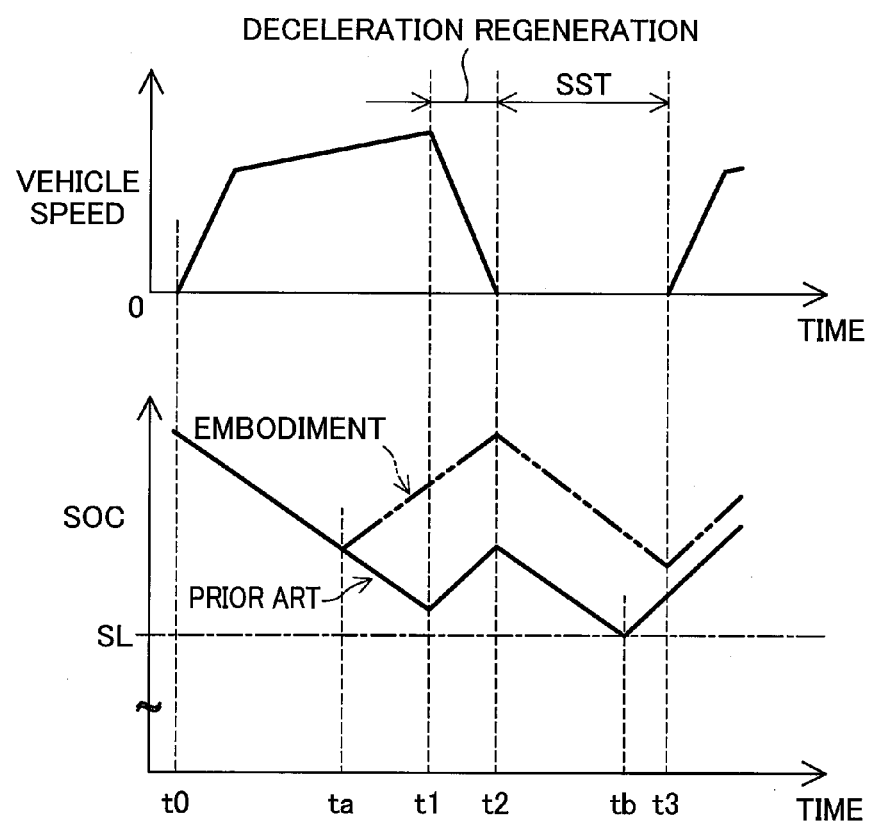
FIG. 6 is a diagram illustrating time charts of vehicle speed and SOC during operation of the automobile.

FIG. 6 is a diagram illustrating time charts of vehicle speed and SOC (present SOC value C2) of the battery 40 during operation of the automobile 200. The time charts have the vehicle speed and the SOC as the ordinate and the time as the abscissa. When the operation of the automobile 200 is started and the automobile 200 starts moving at a time t0, the vehicle speed gradually increases to normal running. The vehicle then shifts to the deceleration state at a time t1. In a t0-t1 period from the time t0 to the time t1, the SOC gradually decreases as shown by the solid line. This solid line, however, indicates a change according to the prior art, and this embodiment has a change as shown by the two-dot chain line. This is described below.

After the time t1, the vehicle stops at a time t2. In a t1-t2 period, the SOC gradually increases as shown by the solid line by regenerative power generation during deceleration. A period from the time t2 (more specifically, at the time when the engine stop condition is satisfied) to a time t3 when the vehicle speed has a rise is a stop and start period SST, when the engine 10 is at stop. In the stop and start period SST, the SOC gradually decreases by power consumption of the auxiliary machinery. According to the prior art, as shown by the solid line, when the SOC decreases to a lower limit SL during this engine stop (time tb), battery control is performed to restart the engine 10. After the engine restart, the SOC increases by power generation using the power of the engine 10, as shown by the solid line.

According to the embodiment, when the SOC decreases during normal running and causes the remaining capacity in the available SOC range of the battery 40 to become less than the capacity for idle reduction (time ta), the SOC is increased by fuel power generation. As shown by the two-dot chain line in illustration, the SOC increases in a ta-t2 period. This increase is in view of the maximum battery capacity expected to be used in the future stop and start period, so that the SOC decreasing in the stop and start period t2-t3 does not reach the lower limit SL. The "future stop and start period" is not limited to one stop and start period SST as illustrated but includes all a plurality of stop and start periods within a predetermined time period.

According to the embodiment, the engine 10 is restarted in the state that the SOC does not decrease to the lower limit in the stop and start period t2-t3, unlike the prior art. The following describes the vehicle state predictor 114 in detail.

D. Configuration of Vehicle State Predictor

FIG. 7 is a block diagram illustrating the functions of the vehicle state predictor 114. As illustrated, the vehicle state predictor 114 includes a current value obtaining section 114a, a specific auxiliary machine operation detecting section 114b, a current change suppressing section 114c, a smoothing process section 114d and an auxiliary machinery power consumption calculating section 114e. The current value obtaining section 114a receives inputs of the alternator current value Aa detected by the alternator current sensor 89 and the battery current value Ab detected by the battery current sensor 88. The specific auxiliary machine operation detecting section 114b receives inputs of the brake switch signal SW1 and the direction indicator switch signal SW2 and determines whether at least one of the brake switch and the direction indicator switch is in the ON state.

The current value obtaining section 114a calculates a current value Ac (FIG. 1) flowing through the auxiliary machinery, based on the alternator current value Aa and the battery current value Ab. The smoothing process section 114d processes the current value Ac by smoothing process. The auxiliary machinery power consumption calculating section 114e calculates an auxiliary machinery power consumption PW, based on a current value Ad after the smoothing process. The current change suppressing section 114c is provided between the current value obtaining section 114a and the smoothing process section 114d. In response to an affirmative detection by the specific auxiliary machine operation detecting section 114b, the current change suppressing section 114c reduces the current value Ac and outputs the reduced current value Ac as a current value Ac* to the smoothing process section 114d, in order to suppress the effect of the latest current value Ac in the smoothing process by the smoothing process section 114d. In response to a negative detection by the specific auxiliary machine operation detecting section 114b, on the other hand, the current change suppressing section 114c directly outputs the current value Ac as the current value Ac* to the smoothing process section 114d. In the description below, the current value Ac is called auxiliary machinery current value Ac; the current value Ac* is called smoothening input current value Ac*; and the current value Ad is called smoothened output current value Ad.

The respective sections 114a to 114d are implemented by the CPU included in the ECU 50 of FIG. 1 executing a computer program stored in the ROM. The following describes a vehicle state prediction routine according to this computer program in detail. The respective sections 114a to 114d may alternatively be implemented by a specific device or hardware circuit other than the ECU 50 shown in FIG. 1. The vehicle state prediction routine consists of two processing routines which are performed individually. The two processing routines are called "first vehicle state prediction routine" and "second vehicle state prediction routine".

FIG. 8 is a flowchart showing the first vehicle state prediction routine. This routine is performed by the CPU included in the ECU 50 as described above repeatedly at predetermined time intervals. When the process starts, the CPU of the ECU 50 first receives the alternator current value Aa from the alternator current sensor 89 and the battery current value Ab from the battery current sensor 88 (step S110). The CPU subsequently calculates an auxiliary machinery current value Ac flowing on a wire connection LN (FIG. 1) side, based on the alternator current value Aa and the battery current value Ab (step S120). More specifically, the auxiliary machinery current value Ac is calculated according to Equation (1) given below:

$$Ac = Aa - Ab \tag{1}$$

After that, the CPU receives the brake switch signal SW1 from the brake switch 84 and the direction indicator switch signal SW2 from the direction indicator switch 87 (step S130). The CPU subsequently determines whether the brake switch signal SW1 is in the ON state or whether the direction indicator switch signal SW2 is in the ON state (step S140). In the case of a negative answer, i.e., when it is determined that the brake switch signal SW1 is in the OFF state and that the direction indicator switch signal SW2 is in the OFF state, the CPU sets the auxiliary machinery current value Ac of this time calculated at step S120 to a smoothing input current value Ac* of this time (step S150). Herein "this time" means this cycle of the first vehicle state prediction routine, and "previous time" means a previous cycle of the first vehicle state prediction routine. As illustrated, each current value obtained in this cycle of the routine is shown as [XXX current value]_new, and each current value obtained in the previous cycle of the routine is shown as [XXX current value]_old. In the first vehicle state prediction routine, the respective current values obtained in this cycle of the routine are temporarily stored in the RAM until a next cycle of the routine.

After execution of step S150, the CPU processes the smoothening input current value Ac* of this time by smoothing process to calculate a smoothened output current value Ad of this time (step S160). The smoothening process smoothens the smoothening input current value Ac* of this time with data of a past predetermined time (for example, 10 seconds) and is performed according to Equation (2) given below:

$$\begin{aligned}[\text{smoothened output current value}]\_new \leftarrow &[\text{smoothened output current value}]\_old + ([\text{auxiliary machinery current value}]\_new - [\text{smoothened output current value}]\_old)/(10000/32)\end{aligned} \quad (2)$$

Equation (2) is on the assumption that the auxiliary machinery current is updated at the cycle of 32 ms and smoothening process is completed in 10 seconds (=10000 ms).

The CPU subsequently multiplies the smoothened output current value Ad of this time by a predetermined voltage to calculate an auxiliary machinery power consumption PW and specifies the calculated auxiliary machinery power consumption PW as a vehicle state P2 (step S170). After execution of step S170, the CPU terminates the first vehicle state prediction routine.

When it is determined at step S140 that the brake switch signal SW1 is in the ON state or that the direction indicator switch signal SW2 is in the ON state, on the other hand, the CPU sets the smoothened output current value Ad of the previous time to the smoothening input current value Ac* of this time (step S180). After execution of step S180, the CPU proceeds to step S160.

The CPU included in the ECU 50 serves as the current value obtaining section 114a (FIG. 7) at steps S110 and S120 in the first vehicle state prediction routine configured as described above. The CPU serves as the specific auxiliary machine operation detecting section 114b (FIG. 7) at steps S130 and S140. The CPU serves as the current change suppressing section 114c (FIG. 7) at step S180. The CPU serves as the smoothing process section 114d (FIG. 7) at step S160. The CPU serves as the auxiliary machinery power consumption calculating section 114e (FIG. 7) at step S170.

Figure 9A:
FIG. 9A to 9D are is a diagram illustrating time charts of various current values when a brake switch signal SW1 is in OFF state and a direction indicator switch signal SW2 is in OFF state.
Figure 9B:
Figure 9C:
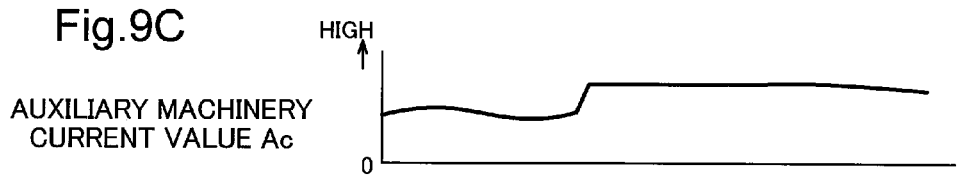
Figure 9D:
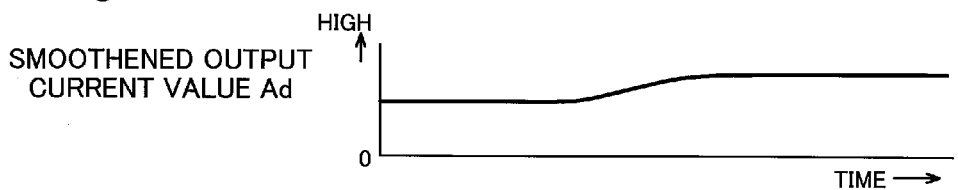

The operations of the first vehicle state prediction routine are described with reference to the time charts of FIGS. 9A to 11. FIG. 9A to 9D are time charts when the brake switch signal SW1 is in the OFF state and when the direction indicator switch signal SW2 is in the OFF state. FIG. 9A shows the brake switch signal SW1; FIG. 9B shows the direction indicator switch signal SW2; FIG. 9C shows the auxiliary machinery current value Ac; and FIG. 9D shows the smoothened output current value Ad. When the brake switch signal SW1 and the direction indicator switch signal SW2 are both in the OFF state as shown in FIGS. 9A and 9B, the auxiliary machinery current value Ac shown in FIG. 9C is subject to the smoothening process to give the smoothened output current value Ad shown in FIG. 9D.

Figure 10A:
FIG. 10A to 10D are a diagram illustrating time charts of various current values when the brake switch signal SW1 is changed to ON state.
Figure 10B:
Figure 10C:
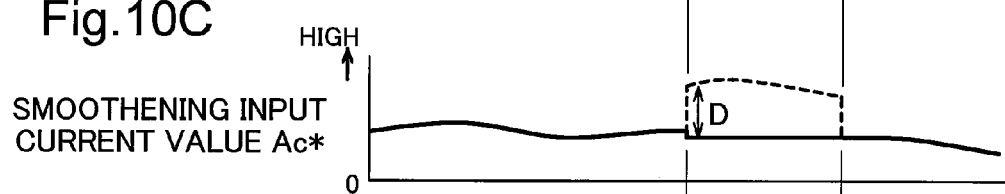
Figure 10D:
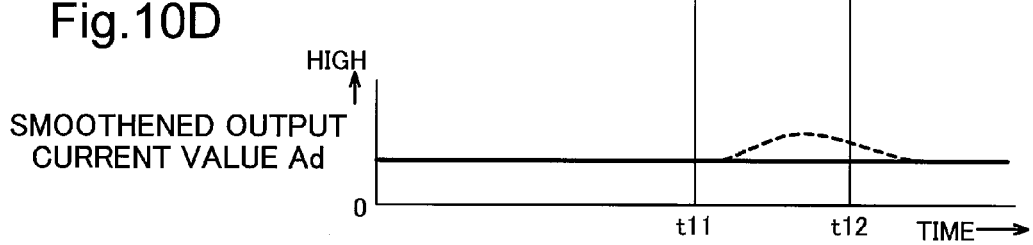

FIG. 10A to 10D are time charts when the brake switch signal SW1 is changed over to the ON state. FIG. 10A shows the brake switch signal SW1; FIG. 10B shows the auxiliary machinery current value Ac; FIG. 10C shows the smoothening input current value Ac*; and FIG. 10D shows the smoothened output current value Ad. When the brake switch signal SW1 is changed over to the ON state (time t11-t12) as shown in FIG. 10A, the auxiliary machinery current value Ac is temporarily increased by lighting up the stop lamp 76 as shown in FIG. 10B. In the period from the time t11 to the time t12, in response to the temporary increase in auxiliary machinery current value Ac, the smoothening input current value Ac* conventionally has a temporary increase as shown by the broken line in FIG. 10C. According to the embodiment, however, the smoothened output current value Ad of the previous time is set to the smoothening input current value Ac* of this time at step S180 (FIG. 8), so that the smoothening input current value Ac* does not have a temporary increase as shown by the solid line in FIG. 10C. Setting the smoothened output current value Ad of the previous time to the smoothening input current value Ac* of this time is equivalent to setting the result of subtraction of a difference D between the auxiliary machinery current value Ac of this time and the smoothened output current value Ad of the previous time from the auxiliary machinery current value Ac of this time, to the smoothening input current value Ac* of this time. The smoothening input current value Ac* is accordingly reduced by the difference D corresponding to the above temporary increase.

When the brake switch 84 is turned ON, the conventional control increases the smoothened output current value Ad as shown by the broken line in FIG. 10D, in response to the temporary increase in smoothening input current value Ac*. The control of this embodiment, however, eliminates such a temporary increase in smoothening input current value Ac* as described above and thereby keeps the smoothened output current value Ad substantially constant as shown by the solid line in FIG. 10D.

Figure 11A:
FIG. 11A to 11D are a diagram illustrating time charts of various current values when the direction indicator switch signal SW2 is changed to ON state.
Figure 11B:
Figure 11C:
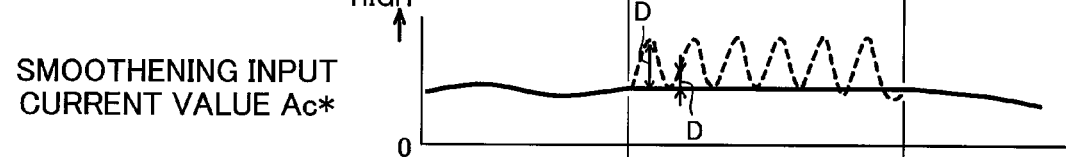
Figure 11D:
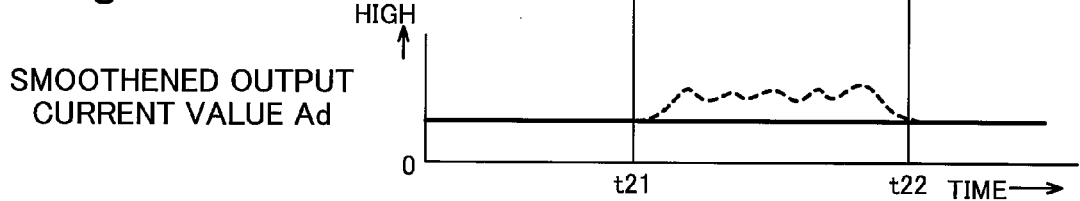

FIG. 11A to 11D are time charts when the direction indicator switch signal SW2 is changed over to the ON state. FIG. 11A shows the direction indicator switch signal SW2; FIG. 11B shows the auxiliary machinery current value Ac; FIG. 11C shows the smoothening input current value Ac*; and FIG. 11D shows the smoothened output current value Ad. When the direction indicator switch signal SW2 is changed over to the ON state (time t21-t22) as shown in FIG. 11A, the auxiliary machinery current value Ac is fluctuated by flashing the lamp of the direction indicator 78 as shown in FIG. 11B. In the period from the time t21 to the time t22, in response to the fluctuation in auxiliary machinery current value Ac, the smoothening input current value Ac* conventionally has a fluctuation as shown by the broken line in FIG. 11C. According to the embodiment, however, the smoothened output current value Ad of the previous time is set to the smoothening input current value Ac* of this time at step S180 (FIG. 8), so that the smoothening input current value Ac* does not have a fluctuation as shown by the solid line in FIG. 11C. Setting the smoothened output current value Ad of the previous time to the smoothening input current value Ac* of this time is equivalent to setting the result of subtraction of a difference D between the auxiliary machinery current value Ac of this time and the smoothened output current value Ad of the previous time from the auxiliary machinery current value Ac of this time, to the smoothening input current value Ac* of this time. The smoothening input current value Ac* is accordingly reduced by the difference D corresponding to the above fluctuation. This results in suppressing the effect of the latest current value in the smoothening process.

When the direction indicator switch 87 is turned ON, the conventional control fluctuates the smoothened output current value Ad as shown by the broken line in FIG. 11D, in response to the fluctuation in smoothening input current value Ac*. The control of this embodiment, however, eliminates such a fluctuation in smoothening input current value Ac* as described above and thereby keeps the smoothened output current value Ad substantially constant as shown by the solid line in FIG. 11D.

Figure 12:
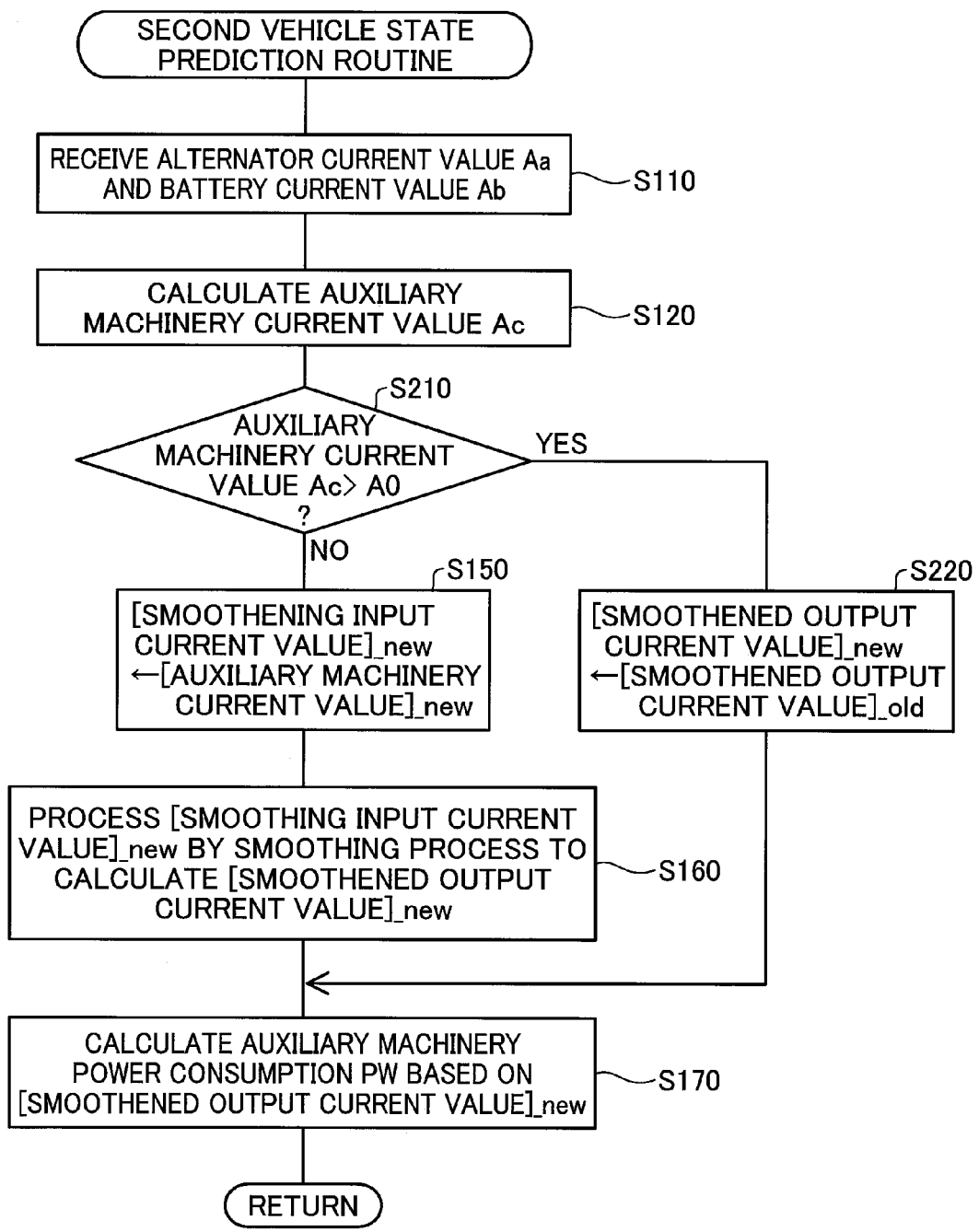
FIG. 12 is a flowchart showing a second vehicle state prediction routine.

FIG. 12 is a flowchart showing the second vehicle state prediction routine. This second vehicle state prediction routine is performed by the CPU included in the ECU 50 repeatedly at predetermined time intervals, separately from the first vehicle state prediction routine (FIG. 8).

The second vehicle state prediction routine includes steps S110, S120, S150, S160 and S170 like the first vehicle state prediction routine (FIG. 8). The processing of these steps is identical with the processing of the corresponding steps in the first vehicle state prediction routine (FIG. 8) and is not specifically described here.

After calculating the auxiliary machinery current value Ac at step S120, the CPU determines whether the auxiliary machinery current value Ac is greater than a specified value A0 (step S210). Large current flows through the starter 30 on the start of the engine 10, so that the specified value A0 is set to, for example, 50[A] to allow for detection of the flow of large current. The value 50[A] is only one example, and the specified value A0 may be any other reference value such as 40[A]. When it is determined at step S210 that the auxiliary machinery Ac is equal to or less than the specified value A0, the CPU proceeds to step S150 to set the auxiliary machinery current value Ac of this time calculated at step S120 to the smoothening input current value Ac* of this time.

When it is determined at step S210 that the auxiliary machinery current value Ac is greater than the specified value A0, on the other hand, the CPU sets the smoothened output current value Ad of the previous time to the smoothened output current value Ad of this time (step S220) and subsequently proceeds to step S170 to calculate the auxiliary machinery power consumption PW based on the smoothened output current value Ad of this time set at step S220.

Figure 13A:
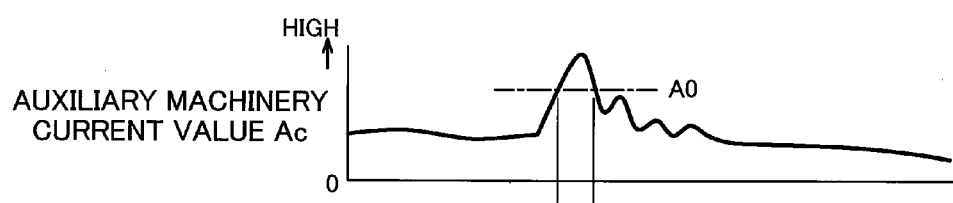
FIGS. 13A and 13B are diagram illustrating time charts of operations in the second vehicle state prediction routine.
Figure 13B:
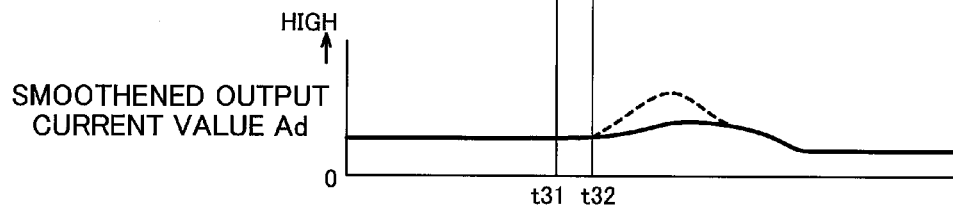

The operations of the second vehicle state prediction routine are described with reference to the time charts of FIGS. 13A and 13B. FIG. 13A shows the auxiliary machinery current value Ac; and FIG. 13B shows the smoothened output current value Ad. For example, when large current flows through the starter 30 on the start of the engine 10, the auxiliary machinery current value Ac instantaneously increases as shown in FIG. 13A. In response to the instantaneous increase in auxiliary machinery current value Ac, the smoothening input current value Ac* conventionally has an increase as shown by the broken line in FIG. 13B. When the auxiliary machinery current value Ac is greater than the specified value A0 (time t31-t32), on the other hand, the control of this embodiment sets the smoothened output current value Ad of the previous time to the smoothened output current value Ad of this time, so that the smoothened output current value Ad does not have an abrupt increase as shown by the solid line in FIG. 13B.

The CPU serves as the specific auxiliary machine operation detecting section 114b (FIG. 7) at step S210 in the second vehicle state prediction routine (FIG. 12) configured as described above. More specifically, it is determined whether a specific auxiliary machine which may have a temporary abrupt increase in current value is in the operating state, based on the determination of whether the auxiliary machinery current value Ac is greater than the specified value A0 at step S210. The CPU serves as the current change suppressing section 114c (FIG. 7) at step S220.

E. Functions and Advantageous Effects

As described above with reference to FIG. 6, the automobile 200 of the embodiment does not restart the engine 10 in the state that the SOC decreases to the lower limit in the stop and start period t2-t3. An engine restart due to shortage of SOC in the middle of the stop and start period requires 3 times to even 5 times the amount of fuel required in the case of an increase in power during operation of the engine to increase the SOC. In other words, the fuel consumption effect per unit SOC (for example, 1% SOC) during engine operation is three times to five times better than that in the case of an engine restart due to shortage of SOC in the middle of the stop and start period. The automobile 200 of the embodiment accordingly improves the fuel consumption, compared with the prior art.

Additionally, when the stop lamp 76 or the direction indicator 78 is operated to have a temporary change in current value flowing through the auxiliary machinery, the embodiment suppresses the effect of the latest current value in the smoothing process. This effectively prevents the distribution ratio between the capacity for charge control and the capacity for idle reduction from being mistakenly specified due to the temporary change of the current value. The direction indicator 78 flashes, and the stop lamp 76 may be repeatedly turned on and off by the driver's operations. The auxiliary machinery current value Ac is accordingly fluctuated by the operations of the stop lamp 76 and the direction indicator 78. When the distribution ratio is specified using the fluctuating auxiliary machinery current value Ac, hunting may occur between the charge control and the idle reduction control. The embodiment, however, keeps the result of the smoothing process substantially constant as described above, thereby preventing the occurrence of such hunting.

When the auxiliary machinery current value Ac is instantaneously increased by actuation of the starter 30, the embodiment also suppresses the effect of the latest current value in the smoothing process. This effectively prevents the distribution ratio between the capacity for charge control and the capacity for idle reduction from being mistakenly specified due to the instantaneous large current. Accordingly this prevents wrong selection between the charge control and the idle reduction control in such cases.

F. Modifications

The present invention is not limited to the embodiment or aspects described above but may be implemented by various other aspects within the scope of the invention. Some examples of possible modifications are given below.

Modification 1

The above embodiment is configured to perform both the first vehicle state prediction routine (FIG. 8) and the second vehicle state prediction routine (FIG. 12), but the invention is not limited to this configuration. For example, the configuration may be modified to perform only the first vehicle state prediction routine or may be modified to perform only the second vehicle state prediction routine. The first vehicle state prediction routine may be modified to perform the processing of step S180 only when the brake switch signal SW1 is changed over to the ON state or may be modified to perform the processing of step S180 only when the direction indicator switch signal SW2 is changed over to the ON state.

Modification 2

The above embodiment includes the stop lamp 76 and the direction indicator 78 as the blinking auxiliary machines that may be repeatedly turned on and off. The invention is, however, not limited to these auxiliary machines but is applicable to other auxiliary machines that may be repeatedly turned on and off. The above embodiment includes the starter 30 as the instantaneous large current-flowing auxiliary machine. The invention is, however, not limited to this auxiliary machine but is applicable to, for example, a power steering, an antilock brake system or a vehicle stability control (VSC) device. Additionally, the embodiment describes the blinking auxiliary machine and the instantaneous large current-flowing auxiliary machine as the specific auxiliary machine that may have a temporary abrupt change in current value. The specific auxiliary machine is, however, not limited to these auxiliary machines but may be an auxiliary machine that may repeat operation and non-operation. The auxiliary machine that may repeat operation and non-operation is, for example, power windows.

Modification 3

According to the above embodiment, the first vehicle state prediction routine (FIG. 8) is configured to set the smoothened output current value Ad of the previous time to the smoothening input current value Ac* of this time (step S180) by the current change suppressing section 114c (FIG. 7) and process the smoothening input current value Ac* of this time by the smoothening process (step S160). This configuration is substantially equivalent to the processing of step S220 in the second vehicle state prediction routine (FIG. 12), i.e., the process of keeping the smoothened output current value Ad of the previous time as the smoothened output current value Ad of this time. The configuration of the first vehicle state prediction routine (FIG. 8) may thus be modified, such that the processing of step S180 is changed to the processing of step S220 in the second vehicle state prediction routine (FIG. 12) and the process flow is changed to go from step S180 to step S170. Similarly, the configuration of the second vehicle state prediction routine (FIG. 12) may be modified, such that the processing of step S220 is changed to the processing of step S180 in the first vehicle state prediction routine (FIG. 8) and the process flow is changed to go from step S220 to step S160. The current change suppressing section 114c is not limited to such configurations but may have any configuration that suppresses the effect of the latest auxiliary machinery current value in the smoothing process.

Modification 4

The above embodiment is configured to determine the SOC distribution request level P3 based on the driving environment index P1 and the vehicle state P2 and calculate the target SOC based on the SOC distribution request level P3. Alternatively, the configuration may be modified to directly calculate the target SOC, based on the driving environment index P1 and the vehicle state P2. More specifically, the configuration may be modified to directly calculate a distribution ratio of the available SOC range of the battery to the capacity for charge control and the capacity for idle reduction, based on the driving environment index P1 and the vehicle state P2.

Modification 5

The above embodiment calculates the SOC distribution request level based on both the driving environment index P1 and the vehicle state P2. Alternatively, the configuration may be modified to calculate the SOC distribution request level based on only the vehicle state P2.

Modification 6

The above embodiment is configured to calculate the current value Ac flowing through the wire connection LN-side (FIG. 1), i.e., the current value of electric current flowing through the general electronics including auxiliary machinery, based on the alternator current value Aa and the battery current value Ab, but the invention is not limited to this configuration. For example, a current sensor may be provided on the upstream side of the wire connection LN, and the current value may be obtained from this current sensor. Any configuration may be employed to obtain the current value of electric current flowing through the general electronics which are operated with electric power of the battery and include auxiliary machinery.

Modification 7

Figure 14:
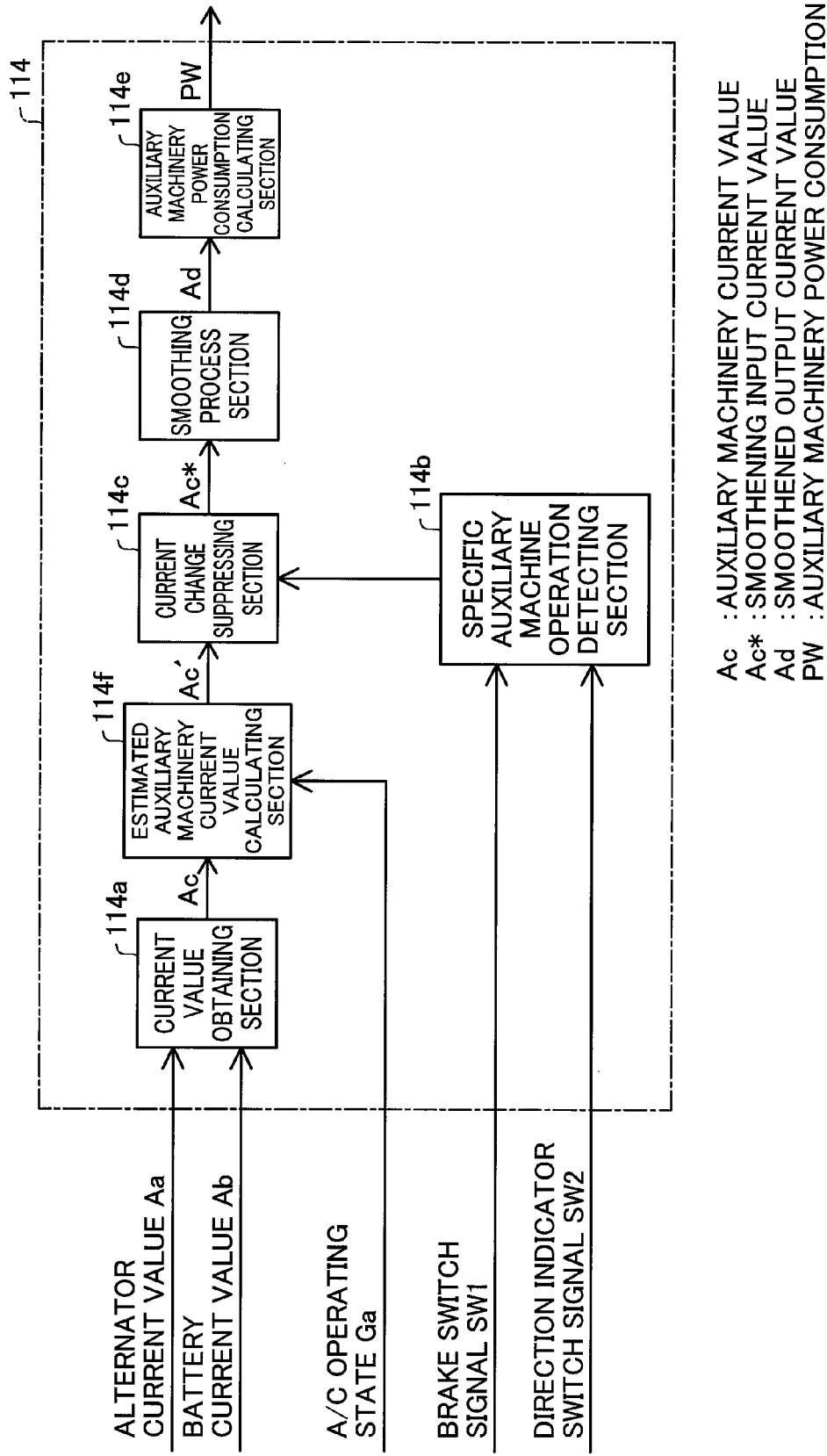
FIG. 14 is a block diagram illustrating a modification of the vehicle state predictor 114 of the embodiment.

According to the configuration of the above embodiment, the current value obtaining section 114a (FIG. 7) calculates the auxiliary machinery current value Ac based on the alternator current value Aa and the battery current value Ab and sends the auxiliary machinery current value Ac to the current change suppressing section 114c (FIG. 7). The invention is, however, not limited to this configuration. For example, as shown in FIG. 14, the configuration may be modified such that an estimated auxiliary machinery current value calculating section 114f may multiply the auxiliary machinery current value Ac by a correction factor and sends a corrected auxiliary machinery current value Ac' to the current change suppressing section 114c. The estimated auxiliary machinery current value calculating section 114f may predict the operating state of the air conditioner 74 according to, for example, the ambient temperature detected by an ambient temperature sensor, the vehicle interior temperature detected by a vehicle interior temperature sensor and the set temperature of an air conditioner temperature setting switch and may correct the auxiliary machinery current value Ac with a variation in auxiliary machinery current required for a response under the predicted control. The estimated auxiliary machinery current value calculating section 114f is, however, not limited to this configuration but may correct the auxiliary machinery current value by taking into account other factors such as an electric fan.

Modification 8

In the above embodiment, the battery is a lead acid battery. The invention is, however, not limited to this type of battery but may be applied to any of various other types of batteries, such as lithium ion battery and rocking chair-type battery. In the above embodiment, the vehicle is an automobile. Alternatively the invention may be applied to a vehicle other than automobile, such as train.

Modification 9

Part of the functions configured by the software in the above embodiment may be configured by hardware (for example, integrated circuit), or part of the functions configured by the hardware may be configured by software.

Modification 10

Among components in the embodiment and the respective modifications described above, components other than those described in independent claims are additional components and may be omitted as appropriate. For example, a modification may omit charge control which suppresses the battery from being charged during normal running to save the amount of fuel consumption and charges the battery by regenerative power generation during deceleration running.

REFERENCE SIGNS LIST

10 Engine
15 Automatic transmission
20 Differential gear
25 Drive wheels
30 Starter
34 Drive mechanism
35 Alternator
40 Battery
50 ECU
70 Auxiliary machinery
72 Headlights
74 Air conditioner
82 Wheel speed sensor
84 Brake switch
86 Accelerator opening sensor
87 Direction indicator switch
88 Battery current sensor
89 Alternator current sensor
90 Idle reduction controller
100 SOC controller
110 Target SOC estimator
112 Driving environment predictor
114 Vehicle state predictor
114a Current value obtaining section 114*b* Specific auxiliary machine operation detecting section
114*c* Current change suppressing section
114*d* Smoothing process section
114*e* Auxiliary machinery power consumption calculating section
116 SOC distribution request level calculator
118 Target SOC calculator
120 Battery SOC calculator
130 Feedback controller
200 Automobile
Aa Alternator current value
Ab Battery current value
Ac Auxiliary machinery current value
Ac* Smoothening input current value
Ad Smoothened output current value

The invention claimed is:

1. A vehicle control device mounted on a vehicle having: an engine; a battery that is chargeable with an amount of electric power generated by a generator which is driven with power of the engine; and auxiliary machinery that are operated with electric power of the battery, the vehicle control device comprising:
    an idle reduction controller that performs idle reduction control;
    an SOC detector that detects a state of charge (SOC) of the battery;
    a current value obtaining section that obtains a current value of electric current flowing through the auxiliary machinery;
    a current correcting section that corrects the current value;
    an idle reduction capacity setting section that sets a capacity for idle reduction, based on the current value corrected by the current correcting section, wherein the capacity for idle reduction is expected to be used in a stop and start period from an engine stop to an engine restart by the idle reduction control, in an available SOC range of the battery, during running of the vehicle; and
    a remaining capacity controller that controls the amount of electric power generated by the generator, in order to avoid a remaining capacity, which corresponds to the SOC detected by the SOC detector, in the available SOC range from becoming less than the capacity for idle reduction during running of the vehicle, wherein
    the current correcting section comprises:
        a smoothing process section that inputs the current value obtained by the current value obtaining section as a smoothing input signal and makes the smoothing input signal subject to a smoothing process;
        a specific auxiliary machine operation detecting section that determines whether a specific auxiliary machine, which is included in the auxiliary machinery and is likely to have a temporary abrupt change of the current value, is in an operating state; and
        a current change suppressing section that replaces the smoothening input signal with a previous output result of the smoothing process section and causes the smoothing process section to make the previous output result subject to the smoothing process, so as to suppress an effect of a latest current value obtained by the current value obtaining section, in the smoothing process, when the specific auxiliary machine is determined to be in the operating state.

2. The vehicle control device according to claim 1, further comprising:
    a charge controller that suppresses power generation by the generator during running of the vehicle and allows the battery to be charged by regenerative power generation during deceleration running of the vehicle, wherein
    the idle reduction capacity setting section sets a parameter specifying a distribution ratio in distribution of the available SOC range of the battery into a capacity for charge control required when the charge controller suppresses power generation by the generator and the capacity for idle reduction, as the capacity for idle reduction.

3. The vehicle control device according to claim 1, wherein the specific auxiliary machine is a blinking auxiliary machine that is likely to be repeatedly turned on and off.

4. The vehicle control device according to claim 3, wherein the blinking auxiliary machine is a stop lamp that is turned on in response to depression of a brake pedal, and
the specific auxiliary machine operation detecting section determines whether a brake switch which detects depression or non-depression of the brake pedal is in an ON state.

5. The vehicle control device according to claim 3, wherein the blinking auxiliary machine is a direction indicator, and
the specific auxiliary machine operation detecting section determines whether a direction indicator switch which gives an instruction to operate the direction indicator is in an ON state.

6. The vehicle control device according to claim 1, wherein the specific auxiliary machine is an instantaneous large current-flowing auxiliary machine that is likely to have an instantaneous flow of large current, and
the specific auxiliary machine operation detecting section determines whether the current value obtained by the current value obtaining section is greater than a specified value.

7. A vehicle, comprising:
an engine;
a battery that is chargeable with an amount of electric power generated by a generator which is driven with power of the engine;
auxiliary machinery that are operated with electric power of the battery;
an idle reduction controller that performs idle reduction control;
an SOC detector that detects a state of charge (SOC) of the battery;
a current value obtaining section that obtains a current value of electric current flowing through the auxiliary machinery;
a current correcting section that corrects the current value;
an idle reduction capacity setting section that sets a capacity for idle reduction, based on the current value corrected by the current correcting section, wherein the capacity for idle reduction is expected to be used in a stop and start period from an engine stop to an engine restart by the idle reduction control, in an available SOC range of the battery, during running of the vehicle; and
a remaining capacity controller that controls the amount of electric power generated by the generator, in order to avoid a remaining capacity, which corresponds to the SOC detected by the SOC detector, in the available SOC range from becoming less than the capacity for idle reduction during running of the vehicle, wherein
the current correcting section comprises:
    a smoothing process section that inputs the current value obtained by the current value obtaining section as a smoothing input signal and makes the smoothing input signal subject to a smoothing process;
    a specific auxiliary machine operation detecting section that determines whether a specific auxiliary machine, which is included in the auxiliary machinery and is likely to have a temporary abrupt change of the current value, is in an operating state; and a current change suppressing section that replaces the smoothening input signal with a previous output result of the smoothing process section and causes the smoothing process section to make the previous output result subject to the smoothing process, so as to suppress an effect of a latest current value obtained by the current value obtaining section, in the smoothing process, when the specific auxiliary machine is determined to be in the operating state.

8. A vehicle control method of controlling a vehicle having an engine; a battery that is chargeable with an amount of electric power generated by a generator which is driven with power of the engine; and auxiliary machinery that are operated with electric power of the battery, the vehicle control method comprising the steps of:
(a) performing idle reduction control;
(b) detecting a state of charge (SOC) of the battery;
(c) obtaining a current value of electric current flowing through the auxiliary machinery;
(d) correcting the current value;
(e) setting a capacity for idle reduction, based on the current value corrected in the step (d), wherein the capacity for idle reduction is expected to be used in a stop and start period from an engine stop to an engine restart by the idle reduction control, in an available SOC range of the battery, during running of the vehicle; and
(f) controlling the amount of electric power generated by the generator, in order to avoid a remaining capacity, which corresponds to the SOC detected in the step (b), in the available SOC range from becoming less than the capacity for idle reduction during running of the vehicle, wherein the step (d) comprises the steps of:
inputting the current value obtained in the step (c) as a smoothing input signal and making the smoothing input signal subject to a smoothing process;

determining whether a specific auxiliary machine, which is included in the auxiliary machinery and is likely to have a temporary abrupt change of the current value, is in an operating state;

making the current value obtained in the step (d) subject to the smoothing process, when the specific auxiliary machine is determined not to be in the operating state; and making a previous process result obtained by the smoothing process performed in a previous time, so as to suppress an effect of a latest current value obtained in the step (d), in the smoothing process, when the specific auxiliary machine is determined to be in the operating state.

* * * * *